United States Patent Office 2,868,787
Patented Jan. 13, 1959

2,868,787

PROCESS OF PREPARING N-BROMINATED HALOGEN COMPOUNDS

Laurene O. Paterson, Adrian, Mich., assignor to Drug Research, Inc., Adrian, Mich., a corporation of Michigan No Drawing. Application August 6, 1956
Serial No. 602,466

4 Claims. (Cl. 260—248)

This invention relates to new methods of preparing organic halogen carriers and specifically relates to new methods of preparing organic halogen carriers containing bromine alone or both chlorine and bromine and is directed particularly to the class of halogen carriers characterized as N-halogen compounds.

Generally, the class of compounds which may be prepared by the present process are characterized as halogenating agents containing at least one N-halogen radical in which structure the halogen atom is loosely bound to the nitrogen atom and is readily available for chemical reaction. Specifically, the products produced by this process are those which contain at least one N-bromo radical and may also contain additional N-bromo or N-chloro groups. Thus compounds such as N-bromo succinimide, N-bromo phthalimide, N-bromo-cyanuric acids, N-bromo melamines, N,N-dibromo-5-substituted hydantoins, N-bromo-toluene-sulfonamide, N-bromo-3a,6a-substituted - glycolurils, N-bromo-5-substituted barbiturates and the like are contemplated as products which may be prepared by this process. In addition, one may also prepare the mixed dihalo-(N-bromo-N-chloro) compounds where more than a single nitrogen atom is in the carrier molecule, such as for example, N-chloro-N-bromo-5-substituted hydantoin.

The compounds which are particularly preferred as N-halogen carriers are classified as N-cyclic imides and are represented by the hydantoins, succinimide, phthalimide, cyanuric acid, the glycolurils, and the like.

The properties and methods of manufacture for many of these compounds have been described in the chemical literature: N-bromoacetamide, Behrend and Schreider, Ann. 318, 373 (1901), N-bromo succinimide, Ziegler, Ann. 551, 109 (1942), N-mono- and N-N-dibromo-dimethyl hydantoin, Orazi, Anales, Asociacion Quemica Argentina, vol. 37, 192 (1949), and vol. 38, 5 (1950). In the preparations as described, the carrier is usually reacted in alkaline medium with bromine, and the N-brominated compound isolated in a solid crystalline form.

Halogen carriers which contain both bromine and chlorine are also known, being described in my copending application Serial No. 438,633, filed June 22, 1954, now U. S. Patent No. 2,779,764. That prior application describes methods of preparing N-bromo-N-chloro-5-substituted hydantoins and N,N-dibromo-5-substituted hydantoins.

Generally, the methods employed in the prior art to prepare these N-brominated carrier compounds comprise reaction of the unsubstituted carrier with elementary bromine in an aqueous alkaline media. In such a reaction one-half of the bromine molecule ($Br_2$) substitutes for the hydrogen atom in the >N—H radical and the remainder combines with that hydrogen atom to form hydrogen bromide (HBr). This acid then reacts with the alkali present to form the alkali bromine salt as a by-product. The carrying out of this reaction by these prior art methods is sometimes rendered difficult since the carrier compounds are often adversely affected by strongly alkaline conditions and localized areas of high bromine concentration.

The following equation will illustrate the preparation of N-bromo succinimide from succinimide by this prior art process:

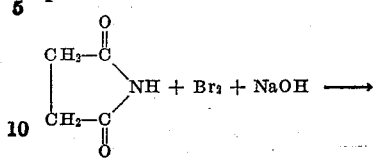
$NH + Br_2 + NaOH \longrightarrow$

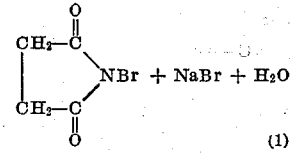
$NBr + NaBr + H_2O$ (1)

From this equation it is readily seen that one-half of the bromine introduced into the reaction mixture is lost as by-product. Since bromine is a costly reagent, it would be advantageous to provide a process for preparing N-brominated halogen carriers which does not involve the loss of by-product alkali bromide.

Accordingly it is an object of the present invention to provide a process for preparing N-bromo halogenating agents which completely utilizes the bromine reactant.

Another object is to provide a process for preparing N-bromo halogen carriers which employs mild reaction conditions.

A further object is to provide a process for preparing N-bromo halogen carriers which may be carried out in the absence of strong base.

A further object is to provide a process for preparing N-halogen carriers which does not employ elementary bromine.

A still further object is to provide a process for making mixed N-bromo-N-chloro halogen carriers.

Further and additional objects will appear from the following description and the appended claims.

In one broad aspect of this invention there is provided a process for preparing N-bromo halogen carriers containing only bromine which comprises treating an N-chloro organic nitrogen compound with a bromine producing compound such as a bromide. Generally the organic nitrogen compounds which are suitable starting materials to prepare the N-bromo derivatives are N-chloro organic nitrogen compounds containing at least one radical selected from the group consisting of:

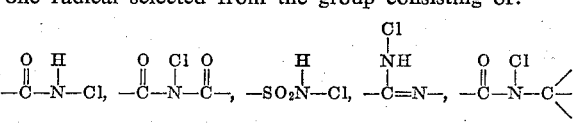

and

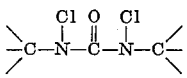

The bromine producer may be a bromide such as a bromine salt of the character of sodium bromide, potassium bromide, and the like. The process of the present invention may be carried out in an aqueous media, or if desired may be carried out in inert organic solvents such as heptane, hexane, carbon tetrachloride, and the like.

The amount of bromine producer or bromide which is utilized in this particular embodiment of the process should be at least one equivalent of bromide for each replacement of a removable chlorine atom contained in the >N—Cl radicals in one mole of the halogen carrier starting materials. Thus where a carrier starting material contains but a single >N—Cl group an equivalent of a bromide such as NaBr (or one mole) would be required per mole of starting material. Similarly, where the carrier starting material contains two >N-chloro groups, two equivalents of bromide are required per mole of carrier starting material. Thus, to produce an N,N-dibromo-5-substituted hydantoin, one would react one mole of N,N-dichloro-5-substituted hydantoin with at least two moles of a bromide such as NaBr. If a divalent salt such as CaBr₂ were used, two equivalents or one mole would be required.

The overall process may be exemplified by the following equation:

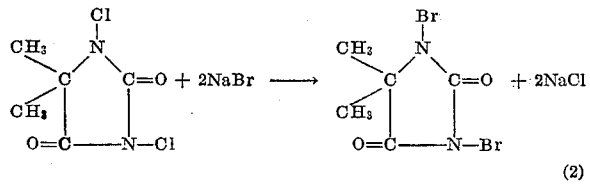

(2)

As may be seen from the above equation, this particular embodiment results in the production of an N-bromo halogen carrier without the use of elementary bromine or alkali. It is also apparent that all of the bromide reactant is utilized and the only by-product is the low cost NaCl.

It is also contemplated as an embodiment of this present process the production of N-bromo halogen carriers wherein the carriers also contain unsubstituted N-hydrogen radicals. According to this modification one may treat a carrier starting material which contains both N-chloro radicals and N-hydrogen radicals with a bromide to replace the chlorine atoms with bromine. Thus for example one may react N-monochloro-5-substituted hydantoins with an equivalent of a bromide such as sodium bromide to produce an N-monobromo-5-substituted hydantoin. It will be noted that in this particular embodiment, as well as the foregoing broad process wherein all of the N-chloro radicals are changed to N-bromo radicals, all of the bromide reactant is utilized to produce a bromine carrier compound. It is also apparent that by this modification one may produce N-bromo halogenating agents under mild reaction conditions characterized by the absence of strong reagents such as elementary bromine or alkali.

The following examples will illustrate the foregoing embodiments of the process of the present invention:

*Example 1*

103 grams of sodium bromide were dissolved in 200 milliliters of water. To this were added, with agitation, 134 grams of N-chloro succinimide. Stirring was continued for 15 minutes, at which time the N-bromo-succinimide was filtered off, washed free of sodium chloride, and dried. It weighed 169 grams, analyzed 44.6% active bromine, and had a melting point of 173° C.

*Example 2*

An aqueous slurry of 63 grams of melamine in a liter of water was prepared, and a stream of chlorine bubbled through the mixture until 71 grams had been taken up. The resultant chlorinated product was filtered off and washed. It was resuspended in water, treated with a solution of sodium bicarbonate to adjust the pH to 6.7, and 100 grams of calcium bromide added. The resultant N,N-dibromomelamine was removed on a filter, washed free of salts, and dried. It analyzed 55.8% bromine.

*Example 3*

The N-chlorinated carrier may also be used in conjunction with elementary bromine to make available all the bromine added to the process. In this method of manufacture, the carrier is treated with bromine and sufficient alkali to take up the hydrogen bromide. The corresponding N-chlorinated carrier is then added to displace the bromine from the by-product bromine salt. Thus:

128 grams of 5,5-dimethyl hydantoin were dissolved in 500 milliliters of iced water containing 40 grams of sodium hydroxide and 55 grams of sodium carbonate. To this were added 320 grams of bromine with agitation. When all the bromine had been taken up, 197 grams of N,N-dichloro-dimethyl hydantoin were stirred in, and agitation continued until the bromination of the N,N-dichloro-dimethyl derivative was also complete. The resultant washed and dried product weighed 550 grams, and analyzed 55.1% bromine. It had a melting point of 188° C. The reactions involved in this process are:

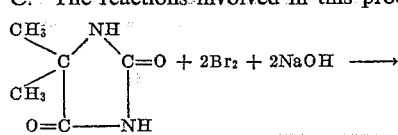

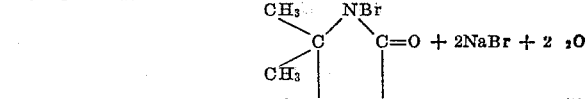

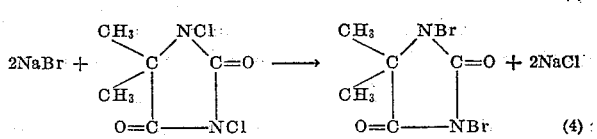

(3)

(4)

The above Equations 3 and 4 illustrate the sequence of the reaction which may be described in its overall aspects according to the following equation:

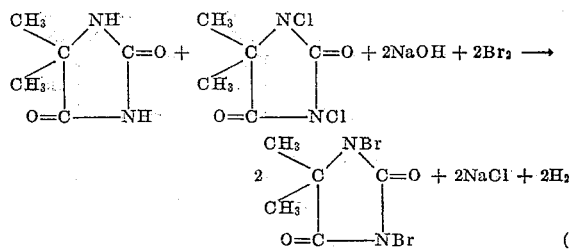

(5)

It is also contemplated as an embodiment of the present invention, the provision of a process for producing N-bromo-N-chloro halogen carriers by reacting an N-chloro carrier compound of the character previously described with a bromide. It has been found that by a modification of the broad process one may obtain these mixed chloro-bromo carrier compounds by utilization of the broad concepts disclosed for the production of N-bromo halogenating agents. Generally to prepare these mixed halogen carriers one reacts an N-chloro halogen carrier containing at least 2-N-chloro radicals with a bromine salt. The amount of bromide required to produce these mixed chloro-bromo halogen carriers is less than that which is required for complete replacement of all of the N-chloro substituents. Thus, for example, by reacting a mole of N,N-dichloro-5-substituted hydantoin with one equivalent of a bromide such as KBr, a mixed chloro-bromo hydantoin is produced. Generally the amount of bromide required to carry out this reaction may vary but in all cases it will be less than an amount which would be required to completely substitute all of the N-chloro substituents. It is also possible to prepare N-chloro-N-bromo-N-hydrogen carrier compositions by reacting a carrier molecule which contains at least three available imide groups of which only two are chlorinated. Thus, for example, one may react N,N-dichloro cyanuric acid with sodium bromide to produce N-chloro-N-bromo cyanuric acid.

The following examples will illustrate the various embodiments of the process of the present invention as applied to making mixed chloro-bromo halogenating agents from N-chloro starting materials.

*Example 4*

273 grams of N,N,N-trichloro-3a,6a-dimethyl glycoluril were suspended in water to form a heavy slurry.

To this were added 533 grams of a crude concentrated solution of alkali and alkaline earth bromides analyzing 30% bromine. When all the bromine had been taken up, the slurry was filtered off, washed and dried. The product consisted of N-chloro-N,N-dibromo-3a,6a-dimethyl glycoluril. It contained theoretical amounts of active halogen.

Example 5

To a solution containing 119 grams of potassium bromide, 211 grams of N,N-dichloro-5-ethyl-5-methyl hydantoin were added with constant agitation. The resultant product, after filtering, washing and drying, weighed 245 grams and contained 31.7% bromine and 14% chlorine.

Example 6

232 grams of N,N,N-trichloro-cyanuric acid were added with constant agitation to a solution of 103 grams of sodium bromide in 1 liter of water. When the bromine had been completely taken up, the product was removed on a filter, washed and dried. It consisted of N,N-dichloro-N-bromo-cyanuric acid, and contained theoretical amounts of these halogens.

Another embodiment of the process of this invention is the provision of a process for preparing admixtures of N-chloro-N-bromo halogen carriers with N,N-dihalo halogen carriers, wherein the dihalo materials contain either chlorine or bromine. For example, referring specifically to 5-substituted hydantoins it is contemplated that admixtures of an N-chloro-N-bromo-5-substituted hydantoin with either an N,N-dichloro or an N,N-dibromo-5-substituted hydantoin may be prepared by reacting an N,N-dichloro-5-substituted hydantoin with a bromide salt. The amount of bromide required will vary with the particular end product desired. For example, to prepare the mixed dihalo with N,N-dichloro less than one equivalent of a bromide per mole of N,N-dichloro hydantoin starting material is required. Thus the bromide forms mixed chloro-bromo hydantoin and to the extent that the bromide utilized is less than an equivalent per mole of starting material, there remains unreacted N,N-dichloro-5-substituted hydantoin present in the admixture. Similarly, if one reacts more than one equivalent but less than two equivalents of a bromide with a mole of N,N-dichloro-5-substituted hydantoin, an admixture of N-chloro-N-bromo-5-substituted hydantoin with N,N-dibromo-5-substituted hydantoin will be formed to the extent that the bromide exceeds one equivalent per mole of starting material. Other mixed halogen carriers may also be prepared by a modification of this process, it merely being required that less than the stoichiometric amount of bromine salt be reacted with the N-polychloro starting material. Thus for example to prepare such an admixture using N,N,N-trichloro-cyanuric acid one would utilize a bromide in an amount ranging from less than one equivalent to somewhat less than three equivalents per mole of starting material, the stoichiometric amount required for complete bromination being at least three equivalents per mole of trichlorocyanuric acid. The following examples will illustrate the above described modification.

Example 7

To an aqueous slurry of 197 grams of N,N-dichloro-5,5-dimethylhydantoin is added with constant stirring 51.5 grams of NaBr. After addition is complete the resultant product is recovered by filtration, washing and drying. The product is an admixture of equal parts of N,N-dichloro-5,5-dimethyl hydantoin and N-bromo-N-chloro-5,5-dimethyl hydantoin.

Example 8

To a slurry of 197 grams of N,N-dichloro-5,5-dimethyl hydantoin in water is added 154.5 grams of NaBr while maintaining constant stirring. The resultant product is recovered by filtration, washed with water and dried. The product is comprised of equal parts of N-chloro-N-bromo-5,5-dimethyl hydantoin and N,N-dibromo-5,5-dimethyl hydantoin.

From the foregoing it is apparent that two different types of what might aptly be termed "multi-halogenated" substituted hydantoins can exist, and can be made by the methods herein described. The bromine may be attached to the nitrogen atom in the 1-position which is vicinal to the 5-substituted carbon atom, or may be attached to the nitrogen atom in the 3-position. Thus there may be N-1-bromo-N-3-chloro, or N-1-chloro-N-3-bromo compounds. It has not been definitely established that the N-chloro-N-bromo compounds produced in accordance with the herein described methods are not mixtures of such isomers. In the subjoined claims, both types of chloro-bromo or bromo-chloro products are claimed.

It is a particularly preferred embodiment of the present invention to utilize 5-substituted hydantoins and 3a,6a substituted glycolurils as starting materials. Thus, with reference to the 5-substituted hydantoin, the radicals on the carbon atom in the number 5 position are given in the examples as being methyl, dimethyl, methyl-ethyl, ethyl, phenyl, diphenyl, or the like. It is to be understood that considerable variations are possible in the substituents in the number 5 position, and compounds such as 5,5-dipropyl, 5,5-phenyl, ethyl may be prepared. Combinations of aliphatic and aromatic radicals containing up to about 10 carbon atoms in each of the respective radicals are contemplated as preferred starting materials, as is disclosed in my copending application, Serial No. 593,047, filed June 22, 1956.

With respect to 3a,6a-substituted glycolurils it is preferred that these substituents be of the same character as those substituents in the number 5 position of the hydantoin starting materials, but for the sake of economy it may be desirable to use only the methyl or ethyl substituted N-chloro-glycolurils.

In summary, it is apparent that the process of the present invention is broadly applicable to the production of N-brominated halogenation agents specifically characterized as being prepared by bromination of N-chloro organic nitrogen compounds containing at least one radical selected from the group consisting of:

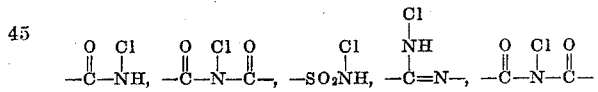

and

Exemplary of compounds containing such groups or radicals are N,N-dichloro-5-substituted hydantoins, N-chloro-succinimide, N-chloro-acetamide, N-chloro-phthalimide, N-chloro-cyanuric acids, N-chloro-toluene-sulfonimides, N-chloro-melamines, N-chloro-5-substituted barbiturates, N-chloro-3a,6a-substituted glycolurils, and the like.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

I claim:

1. A process for preparing N-brominated halogen compounds which comprises treating an N-chlorinated compound selected from the group consisting of N,N-dichloro-5-lower alkyl substituted hydantoins, N-chloro succinimide, N-chlorinated cyanuric acids, N-chlorinated melamines, and N-chlorinated-3a,6a-lower alkyl substituted glycolurils with at least about 0.5 equivalent of an inorganic bromide selected from the group consisting of sodium bromide, potassium bromide, calcium bromide and mixtures thereof, per mole of N-chlorinated compound.

2. The process of claim 1 wherein said chlorinated compound is an N,N-dichloro-5-lower alkyl substituted hydantoin.

3. The process of claim 1 wherein said chlorinated compound is an N-chlorinated cyanuric acid.

4. The process of claim 1 wherein said chlorinated compound is an N-chlorinated-3a,6a-lower alkyl substituted glycoluril.

References Cited in the file of this patent

UNITED STATES PATENTS 2,779,764    Patterson  ---------------  Jan. 29, 1957

OTHER REFERENCES

Chattaway et al.: Journal of the Chemical Society (1902), vol. 81, pages 200–202.